(No Model.)
S. KRAUSHAAR.
VEGETABLE SLICER.
No. 296,757. Patented Apr. 15, 1884.
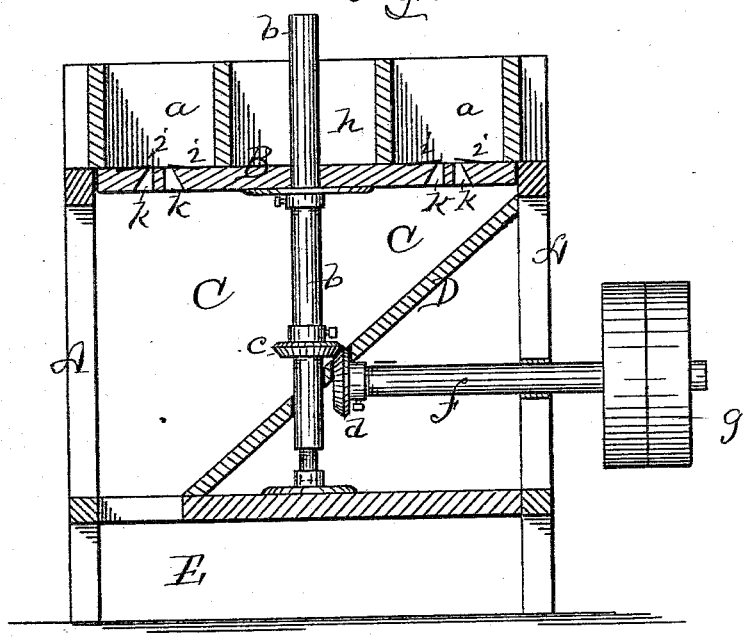
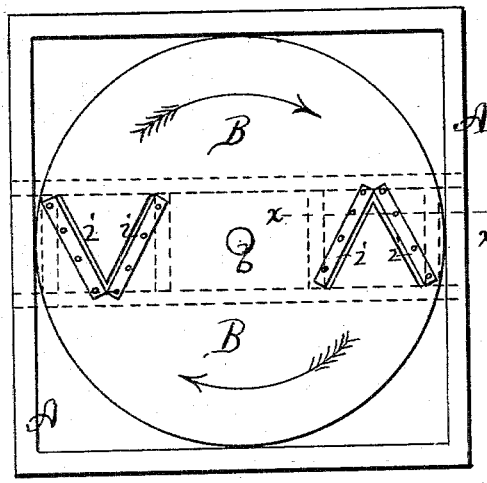
Witnesses:
T. A. Parsons.
J. R. Drake.
S. Kraushaar,
Inventor, by
J. R. Drake,
Atty.

UNITED STATES PATENT OFFICE.

SAMUEL KRAUSHAAR, OF BUFFALO, NEW YORK.

VEGETABLE-SLICER.

SPECIFICATION forming part of Letters Patent No. 296,757, dated April 15, 1884.

Application filed October 13, 1883. (No model.)

*To all whom it may concern:*

Be it known that I, SAMUEL KRAUSHAAR, a citizen of the United States, residing at Buffalo, in the county of Erie and State of New York, have invented certain new and useful Improvements in Sauer-Kraut Cutters, of which the following is a specification, reference being had therein to the accompanying drawings.

This invention relates to a device where the kraut is put tightly in stationary boxes, the bottom of the boxes being a longitudinally-revolving disk provided with flat knives, which, when the disk revolves, cut or shred the kraut, and which falls through openings beneath the knives into a receptacle below.

The object of this invention is to provide a device to rapidly cut sauer-kraut without moving the cabbage over knives by hand, as is usual; and the invention consists in its construction, as hereinafter explained.

In the drawings, Figure 1 is a vertical cross-section about through the center of the device; Fig. 2, a top plan showing the disk, the receptacles dotted in; Fig. 3, a detail of part of the disk and knives in cross-section, and through dotted line $x\ x$, Fig. 2.

A represents an upright frame, with inclosed sides, forming a box, having fastened on top one, two, or more receptacles, $a\ a$, (shown in section, Fig. 1, and in dotted lines, Fig. 2,) having side pieces, but open at the top, the bottom made by a disk, B, fastened on a central vertical shaft, $b$. This disk is revolved by beveled gear-wheels $c\ d$—the former on shaft $b$, and the latter on a horizontal shaft, $f$, operated by a pulley, $g$, or by hand, as may be desired. On the surface of this disk B are fastened flat knives $i\ i$, and set in a V shape, two ends being together and the other ends widened out, the cutting-edges facing each other, as clearly shown in Fig. 2.

Below the edge of each knife the disk is cut away in a slant, leaving openings $k$ clear through the disk and the entire length of the knives. This allows the cut kraut to drop through into the space C below the disk. In this space, on one side, a slanting table, D, is fastened, extending across the space C, and partly inclosing and covering the shafts $b\ f$, so that what drops through on that side from the knives falls down into the bottom opening into a receptacle placed below at E, and all the cuttings on the other side drop straight down.

As will be seen in Fig. 3, the knives $i\ i$ are set in the disk with a slight upward slant, so that they may be adjustable higher or lower to cut coarser or finer.

$h$ is a walled-off space around the top of the central shaft.

The operation is as follows: The cabbage is packed tightly in the receptacles $a\ a$ onto the disk-bottom, which is then rapidly revolved by the shafts $f\ b$, the knives shaving the kraut, and kept in contact with them by a downward pressure of the hand or otherwise, the shavings, in long thread-like pieces, dropping through the knife-openings $k$ into the space C and down into E. The direction of the moving disk is shown by arrows in Fig. 2. By means of the knives being set in a V position, a cut is insured each time the cabbage comes in contact with them. It will be seen that when the cabbage comes in contact with one of the knives, instead of being pushed out to the side of the box, it will be pushed onto the other knife and cut. This arrangement of the knives is important in properly shredding the kraut. The walls of the box A prevent the cut pieces from flying out by the motion of the disk, and the slanting openings $k$ beneath the knives prevent clogging.

There will be one, two, or more sets of knives $i\ i$, and as many receptacles as sets of knives.

In all sauer-kraut cutters with which I am acquainted the knife is stationary, and the kraut is shoved over it by hand. By my simple device much better work is done and faster, as a large quantity can be cut in a short time. It may be found also useful for cutting other vegetables.

I claim—

In a device for cutting cabbage for kraut, the cutting-knives described, set in pairs in a V position, with their cutting-edges facing each other, in combination with a revoluble table, in which the knives are set, means for revolving said table, and boxes or compartments set around the knives, substantially as set forth.

In testimony whereof I affix my signature in presence of two witnesses.

SAMUEL KRAUSHAAR.

Witnesses:
 J. R. DRAKE,
 T. H. PARSONS.